Jan. 13, 1925.
P. MacGAHAN
1,522,735
ELECTRICAL MEASURING INSTRUMENT
Filed March 1, 1920
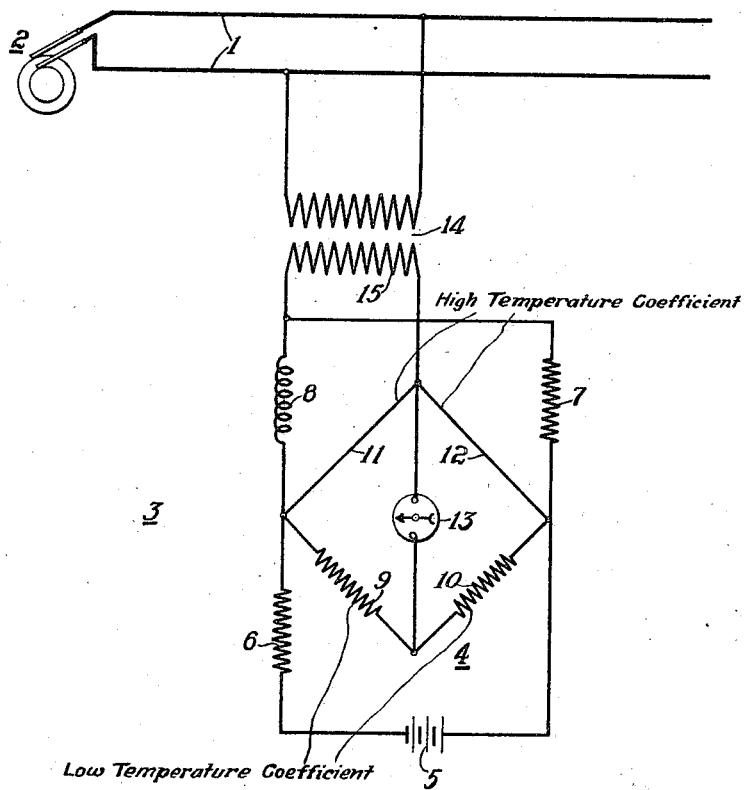
INVENTOR
Paul MacGahan Patented Jan. 13, 1925.

1,522,735

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed March 1, 1920. Serial No. 362,375.

*To all whom it may concern:*

Be it known that I, PAUL MACGAHAN, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to frequency meters.

One object of my invention is to provide a device whereby the frequency of alternations in an electrical circuit may be measured.

Another object of my invention is to provide a device of the above indicated character that shall be simple and compact in construction and effective in its operation.

In practicing my invention, I provide a Wheatstone bridge, two arms of which comprise resistors having a low temperature coprise, and the other two arms of which comprise resistors having a high temperature coefficient. The usual D'Arsonval galvanometer and a direct-current source of electromotive force are employed. In series with each of the arms having a high temperature coefficient, I provide a resistor and a reactor, respectively, each combination being connected across the circuit the frequency of which is to be measured.

The single figure of the accompanying drawing is a diagrammatic view of a measuring device embodying my invention.

A circuit 1 that is connected to a source 2 of alternating electromotive force is provided with a frequency-measuring device 3. The measuring device 3 comprises a static network, including a Wheatstone bridge 4, a direct-current source 5 of electromotive force, a limiting resistor 6, a resistor 7 and a reactor 8. The Wheatstone bridge 4 comprises two arms 9 and 10 having low temperature coefficients, two arms 11 and 12 having high temperature coefficients and an indicating device 13. A potential transformer 14 is provided for connecting the measuring device 3 to the circuit 1.

The circuit comprising the reactor 8 and the arm 11, and that comprising the resistor 7 and the arm 12, of the bridge 4, are respectively connected across the terminals of the secondary winding 15 of the potential transformer 14. For a given standard frequency of the current traversing the circuit 1, the impedances of the circuits through the resistors 11 and 12 are equal and the bridge 4 is normally balanced. However, since the inductor 8 is reactive it will be understood that the impedance to the flow of current will vary in accordance with the change in frequency of the current. Thus, with a change in frequency, the current through the resistor 11 will change while that through the resistor 12 will remain constant, assuming no change in applied voltage. When the current traversing the resistor 11 changes the heating thereof changes, and, consequently, its coefficient of resistance being high, its resistance will change to thus permit of an unbalanced condition in the bridge. This unbalance will cause current to traverse the indicating device 13 from the source 5 of electromotive force, which current will vary in accordance with the difference in current traversing the resistors 11 and 12, and, since this difference in current is caused by a change in frequency in the circuit 1, the instrument 13 will indicate in accordance with the change in frequency. The instrument 13 is properly calibrated to indicate the frequency of the circuit directly.

Although a preferred commercial form of the frequency-measuring device would employ a bridge that would be balanced at a predetermined frequency, the device may be so constructed that the bridge will be balanced at zero frequency and thus measure any frequency.

Although I have shown a preferred diagram of connections for my invention, I do not wish to limit the device to the particular arrangement shown, as modifications may be made in the arrangement thereof without departing from the spirit and scope of the invention, as set forth in the appended claims.

I claim as my invention:

1. In an electrical instrument, the combination with a Wheatstone bridge, of a source of direct current for energizing the bridge galvanometer, a resistor, a reactor and a source of alternating current connected to two arms of the bridge through the resistor and the reactor, respectively.

2. In an electrical instrument, the combination with a Wheatstone bridge, of a source of direct current for energizing the bridge galvonometer, and a source of alternating current connected across a network comprising two parallel circuits, one of which includes a resistor and one arm of the bridge in series, and the other of which includes a reactor and another arm of the bridge in series.

3. In an electrical measuring instrument, the combination with a Wheatstone bridge comprising two arms having high temperature coefficients, two arms having low temperature coefficients and a galvanometer connected between the junctures of each pair of arms, of a source of direct current for energizing the galvanometer, and an alternating current circuit connected to each of the two arms having a high temperature coefficient through a resistor and a reactor, respectively.

4. In an electrical measuring instrument, the combination with a Wheatstone bridge having a galvanometer connected to two terminals thereof and a source of direct current connected to the remaining two terminals, of a resistor having one terminal connected to one of said direct-current terminals of the bridge and the other terminal connected to one terminal of a source of alternating current, the other terminal of the latter being connected to one terminal of the galvananometer, and a reactor having one terminal connected to the other direct-current terminal of the bridge and the other terminal connected to said first terminal of the source of alternating current.

5. In an alternating-current circuit, the combination with a Wheatstone bridge comprising two arms having a low temperature coefficient, two arms having a high temperature coefficient, a galvanometer and a source of direct current therefor, of means for varying the resistance of the arms having a high temperature coefficient in accordance with the frequency of the alternating current.

6. In an alternating-current circuit, the combination with a Wheatstone bridge comprising two arms having a low temperature coefficient, two arms having a high temperature coefficient, a galvanometer and a source of direct current therefor, of means for so varying the resistance of the arms having a high temperature coefficient as to unbalance the bridge in accordance with the frequency of the alternating current.

7. In a frequency meter, the combination with a normally balanced Wheatstone bridge, of means comprising a resistor and a reactor electrically connected to the bridge, and a source of alternating-current for varying the resistance of the bridge to unbalance the same in accordance with the frequency of the alternating-current source.

8. In a frequency meter for an alternating-current circuit, the combination with a Wheatstone bridge comprising two pairs of single-series-path arms having different temperature coefficients, of means for varying the resistance of only one of said pairs of arms in accordance with the frequency of the currents traversing said circuit, a galvanometer connected to the bridge, and a source of direct current connected to the galvanometer through a portion of the bridge and responsive to said variations in resistance.

9. In a frequency meter for an alternating-current circuit, the combination with a Wheatstone bridge comprising single-series-path arms of different temperature coefficients, of means for varying the resistance of only one of said arms in accordance with the frequency of the currents traversing said circuit, a galvanometer connected to the bridge, and a source of direct current connected to the galvanometer through a portion of the bridge and responsive to said variations in resistance.

10. In an electrical measuring instrument, the combination with a source of direct current and a source of alternating current, of a static network including a reactor and a resistor, said network being so constructed and related to said current sources as to be energized by the direct-current source and unbalanced in accordance with the frequency of the alternating current.

11. In an electrical measuring instrument, the combination with a source of direct current and a source of alternating current, of a static network including a reactor and a resistor connected in parallel relation, said network being so constructed and related to the sources of direct and alternating current as to be energized by the former and unbalanced in accordance with the frequency of the alternating current.

12. In an electrical measuring instrument, the combination with a source of direct current and a source of alternating current, of means including a reactor, a resistor and a static network having branch conductors of high and low temperature coefficients, said means being so related to said current sources as to energize the network from the direct-current source and to unbalance the network in accordance with the frequency of the alternating current.

13. The combination with a Wheatstone bridge comprising two arms having high temperature coefficients, two arms having low temperature coefficients and a circuit extending between the junctures of each pair of arms, of a source of direct current for energizing the bridge, and an alternating-current circuit connected to each of the high-temperature arms through impedance devices of different characteristics.

In testimony whereof, I have hereunto subscribed my name this 19th day of February, 1920.

PAUL MacGAHAN.